United States Patent Office 3,507,103
Patented Apr. 21, 1970

3,507,103
TOBACCO HARVESTER
William L. Pickett, 101 Cherry St., and Linwood J. Cooper, Rte. 2, both of Scotland Neck, N.C. 27874, and Joseph J. Harrington, General Delivery, Lewiston, N.C. 27849
Filed Oct. 2, 1967, Ser. No. 672,165
Int. Cl. A01d 45/16
U.S. Cl. 56—27.5            12 Claims

ABSTRACT OF THE DISCLOSURE

A tobacco harvester with defoliator means, stalk gripping means to assist during defoliation, conveyor means for carrying away loose leaves, and means to suspend the defoliator means so that it can swing laterally with respect to the longitudinal axis of the machine.

---

This invention relates to tobacco harvesting machines and more particularly to a machine for stripping the leaves from the stalks of tobacco plants standing in the field.

BACKGROUND

For more than a hundred years the harvesting of tobacco has been a manual operation. Tobacco must be harvested at a particular time in the growing season and the leaves of the plant ripen at different times, the leaves progressively ripening from the bottom to the top of the stalk. The conventional practice has been for "primers" to proceed through the field five or six different times during the harvesting period, and in each succeeding pass through the field the lowermost ripened leaves of the plants are removed by hand by the primer.

Far-sighted tobacco men have realized that due to the decreasing availability of people that are able and willing to do farm labor, it would sooner or later become necessary to at least partially rely upon various mechanized means for the harvesting of tobacco leaves. Most tobacco men feel that mechanization will require that the tobacco leaves will have to be handled in bulk form. The following patents illustrate some of the thought that has gone into equipment that would be suitable for the mechanized harvesting of tobacco leaves by progressively stripping the leaves from the stalks; 2,635,408, 2,816,411, 2,834,173, 2,834,174, 2,876,610, 2,940,615, 3,083,517, 3,093,949.

FIELD OF THE INVENTION

Considered from one aspect, the present invention pertains to a machine for stripping tobacco leaves from the stalks of rows of tobacco plants standing in a field comprising:

(a) A mobile frame adapted to travel along a row,
(b) Defoliator means carried by said frame for stripping leaves from the tobacco stalks as said frame moves along a row,
(c) Guide means associated with said frame for guiding successive tobacco stalks into said defoliator means,
(d) Conveyor means carried by said frame for receiving and carrying away the loose leaves stripped off by the defoliator means, and
(e) Stalk gripping means located beneath said defoliator means for holding said stalk in an upright position during the interval of time that said defoliator means is stripping leaves therefrom.

Considered from another aspect our invention additionally includes the concept of employing transversely moving conveyors positioned immediately to the sides of said defoliator members in such a position as to initially receive the leaves as they are stripped off and to transport such leaves in a direction generally transverse to the direction of movement of the machine, and a longitudinally moving conveyor positioned laterally outwardly of each transversely moving conveyor onto which the transversely moving conveyor delivers the leaves which it receives, and which is adapted to move the leaves to a receiving bin or rack or sorting area.

Considered from another aspect our invention additionally includes the concept of a tobacco harvester wherein the defoliator means, the guide means, and the stalk gripping means have at least their front ends suspended from an upper portion of said mobile frame so that at least the front portions of said defoliator means, guide means, and stalk gripping means will have a considerable degree of freedom to swing laterally thru a pendulum-like arc with respect to the longitudinal axis of said machine.

There are a great many other novel features and novel and inventive combinations and elements which will become more apparent when the following description is considered in conjunction with the drawings.

MAIN FRAME

Referring now to the drawings, the main frame of the harvester is seen to have (see FIGURES 1 and 2) a plurality of upstanding leg members 20 and 20' which have wheels 22 or the like on their lower ends. One or all of the wheels may be driven by any suitable means. The upper ends of the legs are interconnected by a network of main frame members 26–34 which primarily serve to support a motor 24 and the parts of the machine that serve in one way or another assist in harvesting tobacco leaves. Suitable steering means permits the harvester to be guided in any desired direction. The manner by which the drive shaft of a motor (such as 24) can be coupled to auxiliary driving shafts through the use of sprockets, chains, universals, and the like is so well known to those skilled in this art that the details of such driving arrangements have been largely omitted from the drawings. There are a great variety of other drive arrangements that immediately occur to those skilled in this art (including hydraulic drive means) that could be used in place of that shown. It will also be undertood that whereas a 3-wheel harvester has been shown, t would obviously involve no invention to employ instead ι 4-wheel arrangement, and likewise it would involve no nvention to have the driver's seat elsewhere on the vehicle.

DEFOLIATOR MEANS

One of the most important units supported by the main frame is the defoliating unit which actually strips leaves from the tobacco stalks as the harvester moves along a row of tobacco plants. Defoliating means of the type suitable for our invention are well known in the art and in particular the defoliators shown in U.S. Patent 2,834,174 are suitable. The disclosure of U.S. Patent 2,834,174 is therefore incorporated by reference for its disclosure of a suitable defoliator means that would be useful in connection with the present invention.

Figure 3:
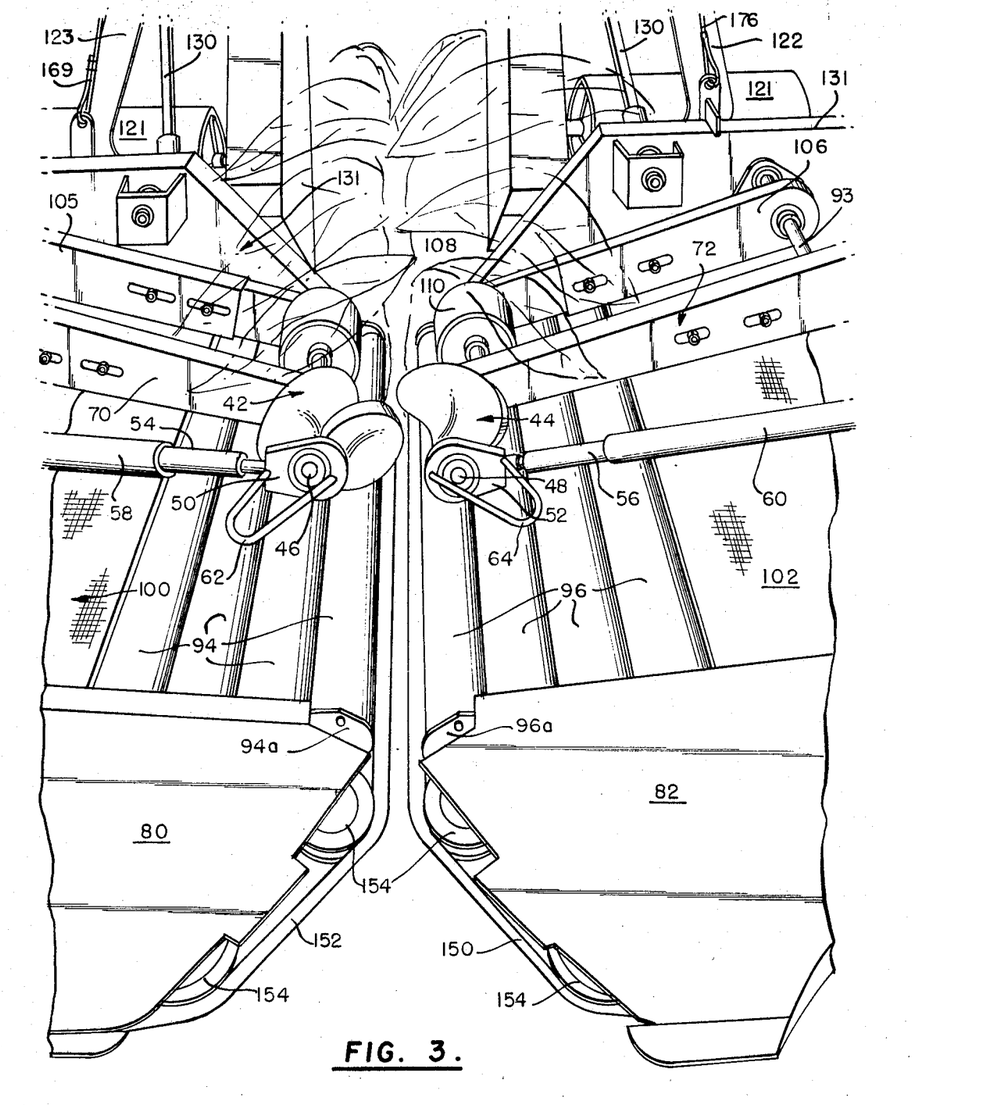
FIGURE 3 is an enlarged fragmentary view, taken slightly from above, of the leaf stripping assembly.
Figure 4:
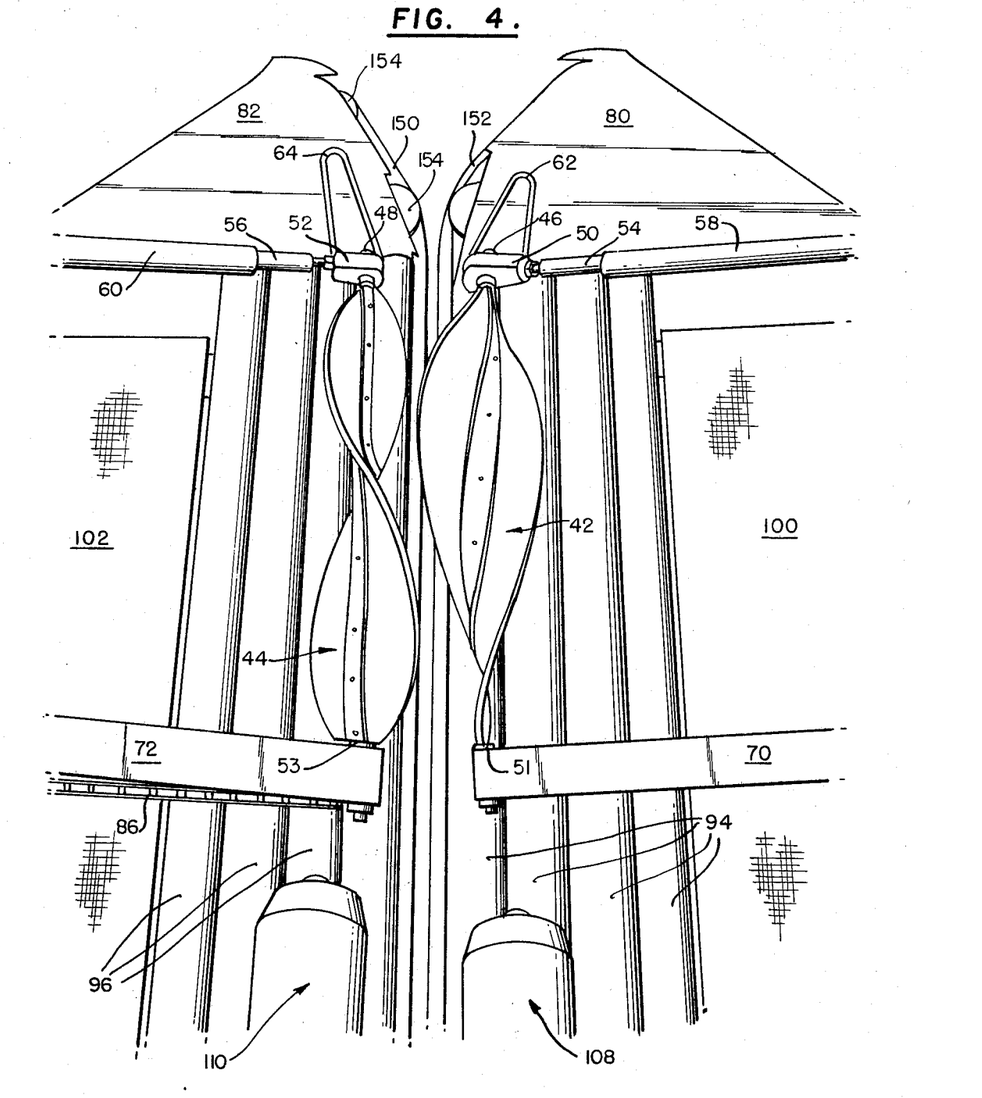
FIGURE 4 is a view similar to FIGURE 3, except that it is from the rear and above.

With particular reference to the attached drawings (and particularly FIGURES 3 and 4) it will be seen that the unit includes two longitudinally extending shafts 46 and 48 which, in operation, are disposed in an upwardly and forwardly inclined position of between about 10° and 40° with respect to the horizontal and preferably between about 15° and 25°. Secured on said shafts in any suitable manner are defoliating members 42 and 44 which are preferably made of a resilient material, such is rubber, leather, plastic or the like. The resilient defoliator members are a pair of oppositely directed radially extending webs disposed in a generally helical arrangement. They may for example be about 22 inches in length. The resilient elements 42 and 44 are preferably initially extruded or otherwise formed in a flat endless strip and then cut to proper length. The helical formation or twist is preferably provided after the resilient element has been secured to its respective supporting shaft by any suitable fastening technique, so that an appropriate "twist" is given to the entire assembly.

In normal operation, it is preferred that the pitch of the helix of the defoliators be approximately two revolutions for every yard. In a preferred embodiment the defoliator may have about 1.5 turns. While the particular shape and relationship of the defoliators as outlined above is preferred, it will be understood that other shapes and pitches may be utilized. Also, one defoliator can be perfectly flat (or planar) and the other defoliator can be helical.

Each of the shafts 46 and 48 for the defoliator members 42 and 44 is rotatably mounted in a generally U-shaped frame that is secured to side members 144 and 145. For instance, with reference to FIGURES 1 and 2, the U-shaped frame on the left is composed of support arms 58 and 70 and a plate member 74 that is attached to side member 145, while the U-shaped member on the right side is composed of support arms 60 and 72 and a plate similar to member 74 that is attached to side member 144. Shaft 46 of the defoliating member 42 is located between bearing mounts 50 and 51 (which are located on the outwardly extending ends of support arms 54 and 70 respectively) whereas shaft 48 supports the other defoliating member 44 and is located in the bearing mounts 52 and 53 there are fixed on the outer extremities of supports 56 and 72 respectively. Bearing mounts 50, 51, 52 and 53 permit free rotation of the shafts 46 and 48. It is also to be noted (see FIGURE 5) that the rearmost portions of shafts 46 and 48 are provided with sprockets 47 and 49 so that these shafts may be driven by chains 90 and 86. The support arms that hold the defoliators can be made in two telescoping sections so as to permit the defoliators to be moved closer together or further apart, if desired.

Figure 2:
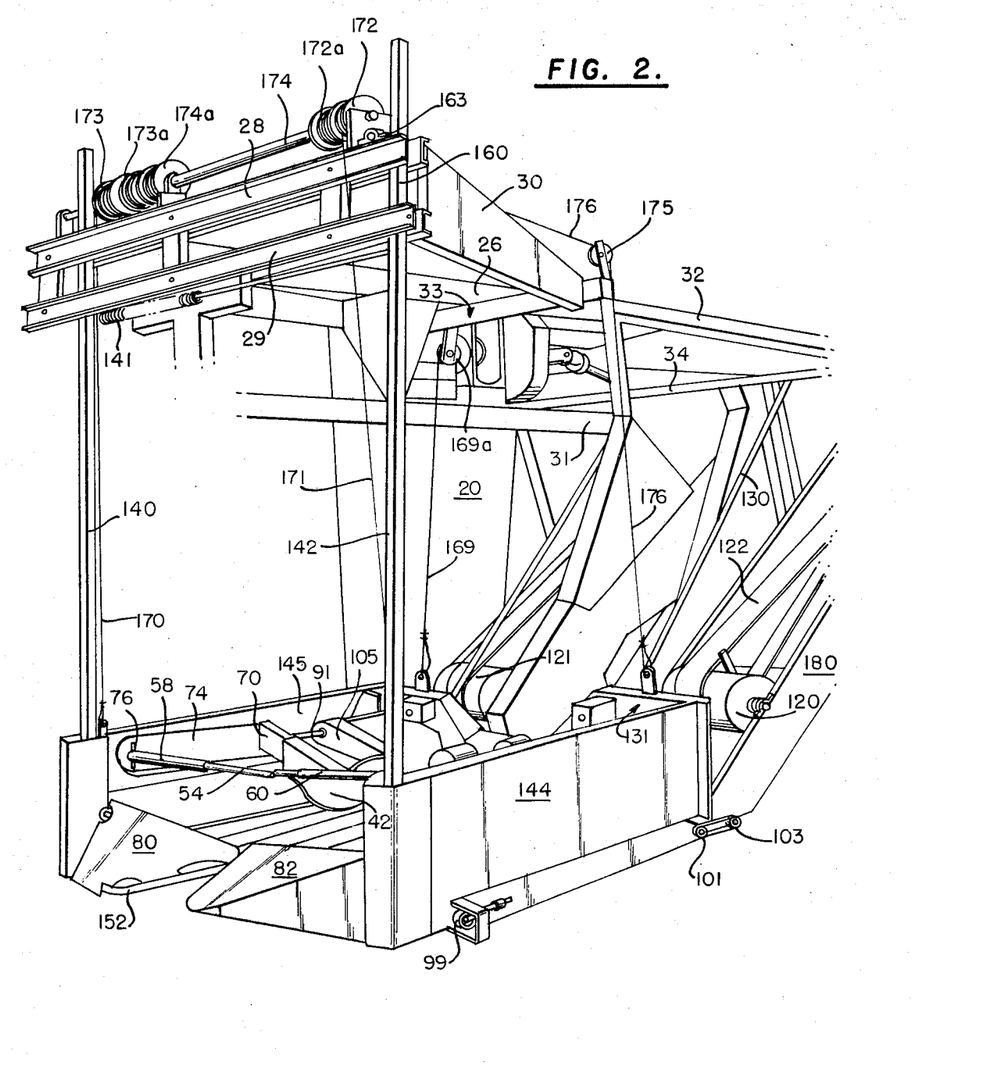
FIGURE 2 is an enlarged fragmentary view of FIGURE 1.

The U-shaped supporting members described above are preferably mounted so that the angular position of the defoliator members with respect to the ground may be adjusted. One way of accomplishing this is to provide a slot and bolt arrangement 76 in the plate 74, as is indicated in FIGURE 2. By loosening the bolt and slot arrangement 76, the plate 74 can be moved up or down and the angle of the defoliator member 42 thereby changed with respect to the ground.

In order to avoid as much as possible the chance that tobacco leaves or stalks will become snagged on any part of the defoliator supporting assembly, guide members 62 and 64 are preferably positioned in advance of the defoliator shafts 46 and 48, whereby the stalks and leaves will be smoothly guided between the defoliator members 42 and 44.

Instead of using guide members 62 and 64, the support arm 54–58 and the support arm 56–60, instead of being perfectly straight as shown, may be curved (for instance in the shape of a quarter circle) and the support arms will then serve as guides to smoothly guide the tobacco stalks.

Figure 5:
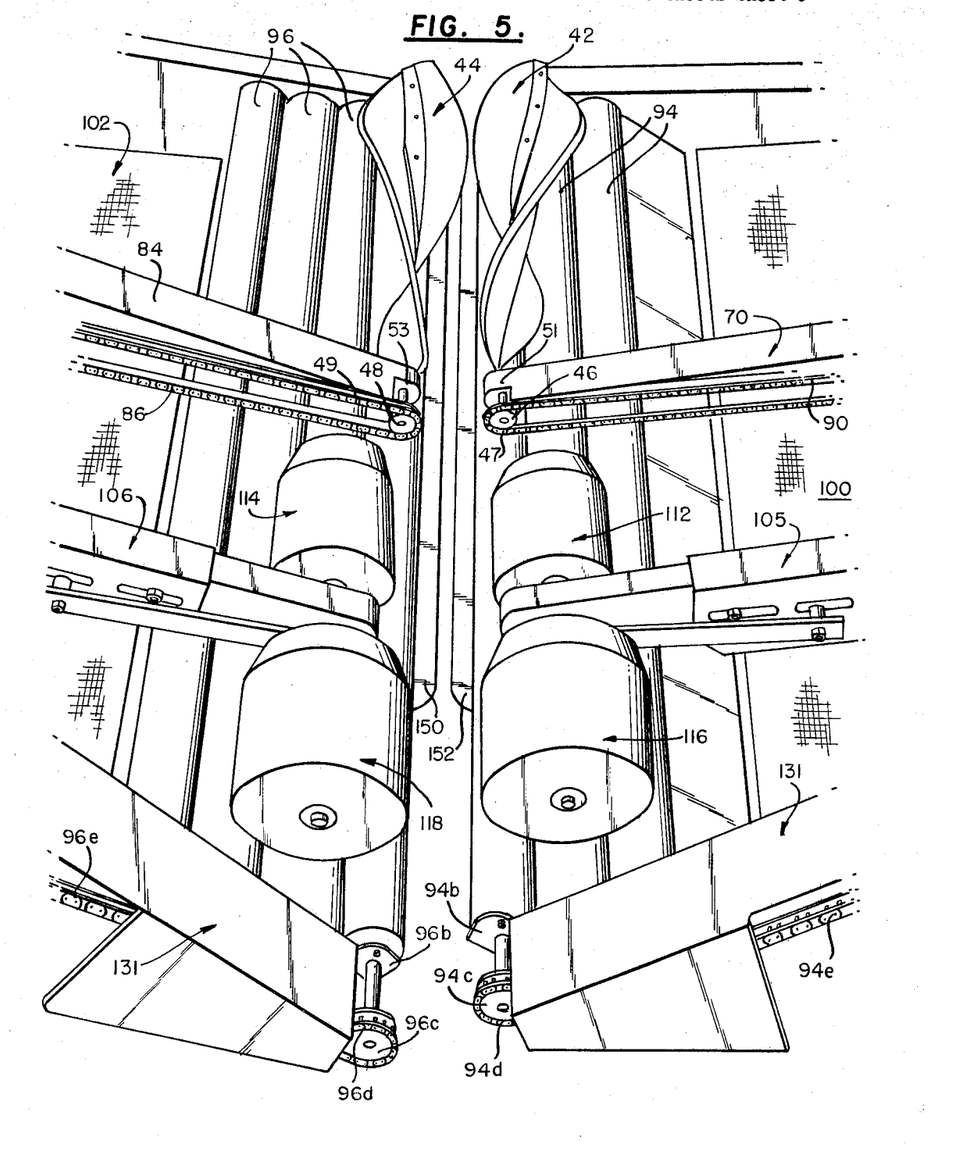
FIGURE 5 is similar to FIGURE 4, but showing an alternative arrangement of salvage rollers.

As indicated above, the defoliator drive shafts 46 and 48 may be driven by any suitable means, such as by the sprocket (47 and 49) and chain (90 and 86) arrangement shown in FIGURE 5. These chains 90 and 86 are in turn driven by sprocketed shafts 91 and 93 (see FIGURES 2, 3 and 6). Shafts 91 and 93 are in turn driven by a suitable gear or gear and chain arrangement located within housings 131 (which will be described more fully hereinafter). The defoliators may also be driven by a cable drive means if desired. The speed is not critical and will depend upon such factors as the condition of the tobacco, the type of tobacco, weather conditons, etc., and this optimum speed can be found with a little experimentation. However, the speed should not be so slow that the leaves "wad up" during the course of the stripping process.

With regard to the operation of the defoliators, as the tobacco harvesting device moves along a row of tobacco plants, the stalks are guided between the defoliators 42 and 44 which are rotating in opposite directions and these defoliators will engage the tobacco stalks with a downward "wiping" action plus considerable "impact" force due to the speed of rotation of the defoliators. It is preferable to arrange the defoliating members 42 and 44 so that they will be about 90° out of phase with respect to each other. In other words, it is preferable to offset the adjacent crest of the defoliators so that two crests will never be in engagement with the stalk at the same time (because they then might compete for the same leaf and tear it). By virtue of the fact that the defoliators are continuous throughout their length, they will engage the tobacco leaves adjacent their point of contact with the stalks with a smooth continuous action so as to push or rub the leaves free from the stalk. Hence, in this manner the complete removal of the leaves from a certain incremental portion (e.g. 4 to 12 inch portion) on the stalk can be achieved.

While not specifically shown in the drawings, our invention also contemplates the use of sets of rotating knives above the defoliators. Such knives are particularly useful when attempting to remove the leaves that are closet to the top portion of the stalk. The actual construction of such rotating knife or cutter arrangements is shown in some of the above mentioned patents.

GUIDE MEANS

The tobacco stalks may be guided into the area between the cooperating defoliating members 42 and 44 by any suitable guide means located in advance of the defoliators. As shown in the drawings, the guide means comprise (a) fixed components 80 and 82 which have a somewhat pointed leading edge and which thereafter diverge in a backward direction and (b) moving components. Guide members 80 and 82 are attached (at a flared-apart angle) to the front forward portions of 145 and 144 respectively. Various other satisfactory shapes and designs for the fixed component of the guide means are shown in the aforementioned patents. The moving components of the guide means comprise the moving belts 150 and 152 (described more fully hereinafter) or equivalent means such as a plurality of aligned rollers or discs that would be equivalent to belts.

CONVEYING MEANS

In accordance with the arrangement shown in the drawings, the leaves that are removed by the defoliator members 42 and 44 drop downwardly and are transported laterally by lateral conveying means 94 and 96. The general concept of laterally conveying stripped leaves is shown by some of the aforementioned patents. However, it has been found that when the lateral conveying means consists of a plurality of driven rollers, a number of advantages are obtained. More specifically with reference to the attached drawings (and particularly FIGURE 5) it will be seen that the sets of conveying rollers 94 and 96 each have a central shaft and are mounted for rotation within brackets (e.g. 94b and 96b) and the sprockets (94c and 96c) mounted on the end of each shaft can be driven by a suitable chain (e.g. 94d and 96d) located within housings 131. Chains 94d and 96d are in turn driven by any suitable interconnection with the main drive assembly.

Each of the roller conveyors in a given set (i.e., sets 94 and 96) rotate in the same direction; but the set as a whole rotates in a direction opposite to that of the defoliator with which the set is associated.

A single conveyor belt could be used in place of each set of rollers, but it is not preferred.

The leaves moved laterally by the above described sets of conveying rollers must then be moved to a receiving bin or a sorting area or to a bulk rack station. This can be achieved in a number of different ways, as is indicated by some of the aforementioned prior art patents. Each system seems to have certain advantages and disadvantages. In accordance with this invention, a longitudinally moving conveyor is positioned laterally outwardly of each transversely moving conveyor and is adapted to (a) first receive the leaves that have been moved laterally by each of the transversely moving conveyors and (b) thereafter move said received leaves in a direction which is generally parallel to the line of movement of the machine. The location and relative positional relationship of each longitudinally moving conveyor can probably be best understood by reference to FIGURES 3, 6, 7 and 10. In these figures it will be noted that longitudinally moving conveyors 100 and 102 are positioned to sides of lateral conveyors 94 and 96. Conveyor 102 is a continuous loop of conveyor supported by end rollers 99 and 101. As the stripped leaves move from left to right on conveyor 102 (see FIGURE 7) they reach the end of belt 102 and are then picked by inclined conveyor belt 104. Conveyor 104 is supported by end rollers 103 and 132. After the leaves are carried to the top of conveyor belt 104 they pass over roller 132 and then drop into the leaf receiving bin 134.

We have found it preferable to utilize a belt 122 in conjunction with conveyor 104 to insure that the leaves will be easily carried upwardly and in a rearward direction. Belt 122 is mounted upon end rollers 120 and 130.

Figure 1:
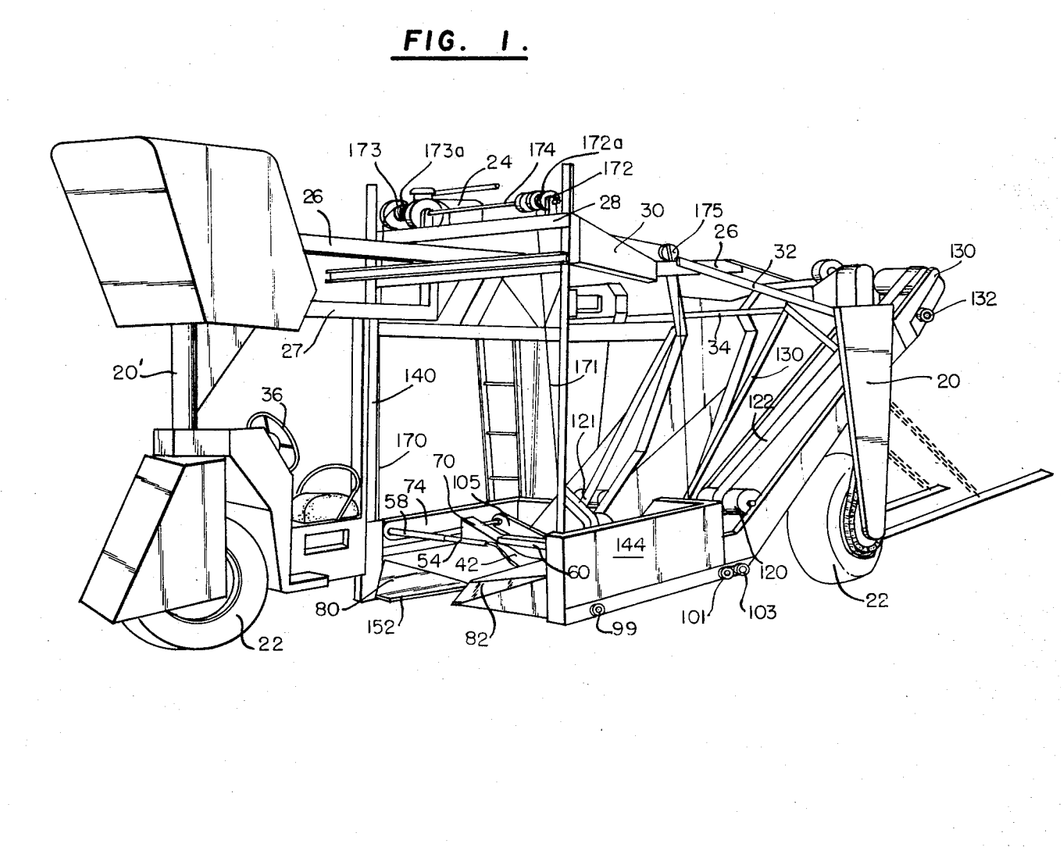
FIGURE 1 is a perspective view of the entire tobacco harvester.

Conveyors 102 and 104 as well as belt 122 can be driven in any desired manner. As is indicated in FIGURE 1, belts 101 and 103 are driven in unison by virtue of a chain arrangement. Any of the end rollers 99, 101, 103, 132, 120 or 130 (see FIGURE 7) may be driven by a sprocket and chain arrangement (not shown) from the main power source of the harvester or from one of the subsidiary power chains.

STALK GRIPPING MEANS

One of the shortcomings of prior art defoliating tobacco harvesters is that as the defoliators worked from the lower part of the stalk to the upper part of the stalk, the decreasing diameter of the stalk resulted in its being so "limber" or "flimsy" that the efficiency of the "wiping" or "impact" action of the defoliators was frequently impaired during its ascent to such an extent that many harvestable tobacco leaves were not removed from the stalks. Stated in another way, with prior art tobacco harvesters the priming process became less efficient as the defoliators worked their way up the stalks on successive days or weeks.

The present inventors discovered that this undesirable aspect of prior tobacco harvesters could either be completely eliminated or greatly improved by incorporating into the tobacco harvester some means for holding or gripping the tobacco stalks in the area immediately below the defoliators during the interval of time that the defoliators are acting on the stalks. It was further discovered that the means for so holding or gripping the tobacco stalks could take a number of different forms.

Figure 8:
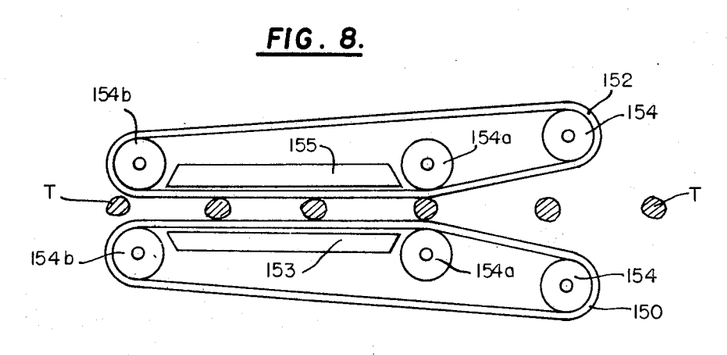
FIGURE 8 is a diagrammatic-type drawing illustrating the manner in which the stalk gripping belts can be arranged and driven.

First of all, the stalk holding or gripping means may simply consist of two separate traveling belts (one located below each defoliator) which are disposed in approximately the same plane, but on opposite sides of the stalk and which cooperate to grip the stalk therebetween. More particularly, stalk gripping belts 152 and 150 are illustrated in the drawings (FIGURES 1, 2, 3, 4). Belts 152 and 150 are actually separate continuous belt loops that move over a plurality of pulleys 154 and 154b. FIGURE 8 is a simplified diagrammatic-type of illustration showing how such stalk gripping belts are designed to operate. The tobacco stalks T first enter the area where the belts 150 and 152 are spread apart and thereafter are gripped between the belts 150 and 152 during the interval of time that the belts are moving between rollers 154a and 154b.

As indicated in FIGURE 8 the stalk gripping belts 150 and 152 are preferably provided with some sort of a back up means (such as members 153 and 155) between the pulleys 154a and 154b so as to lend support to the belts in this area as the belts are gripping the tobacco stalks T. Although the back up means 153 and 155 are each shown as single entities, each back up means could be divided into two or three or four different segments. Each segment could be urged toward its respective belt by means of spring means, or alternatively each segment could be supported adjacent its mid-portion or a pivot means. The segments need not be directly opposite each other but rather can be staggered so that they are not directly opposite each other. The belts 150 and 152 are preferably driven at exactly the same speed that the tobacco harvester is moving over the ground so that when the belts do grip the tobacco stalks, the stalks will remain in an upright position and the belts will not have a tendency to pull the stalks either forwardly or backwardly. The belts can be driven in any desired way, and probably the simplest means is to use the pulleys 152, 154a or 154b as a driving pulley, such driving pulley being on the same shaft as another pulley that is driven by a chain or sprocket arrangement connected to the wheels of the tobacco harvester and geared in such a manner that there is a one-to-one ratio between the forward movement of the harvester and the rearward movement of the belts. Furthermore, belts 150 and 152 should move in unison with each other.

The value of the stalk gripping belts increase as the defoliators work on higher and higher parts of the stalks, because the upper parts of the stalks are not only thinner and more flimsy, but they are also more subject to bending by the wind. In fact, on the first priming run, when the defoliators are to operate on the lowest part of the tobacco stalk, one can sometimes take the stalk gripping belts off of the harvester in order to get closer to the ground—and no disadvantages will usually result because there is much less need to "steady" the stalk at its lower extremities. (The "floating carriage," to be described hereinafter would take care of the stalks that were slightly "out of line" with respect to the other stalks.)

The belts should grip without substantial "slippage" as the stalk is subjected to the action of the defoliators.

"Slippage" is most easily avoided by causing the cooperating stalk gripping belts to move backwardly with respect to the machine exactly as fast as the machine is moving forwardly with respect to the stalks. This is easily accomplished by suitably interconnecting the gears that drive the wheels of the harvester with the drive pulleys for the two stalk gripping belts. Most preferably the two stalk gripping belts are separate belt loops mounted in separate supporting frameworks. Some means must be provided to insure that the stalk gripping means will firmly grip both stalks that are thick and stalks that are thin. There are several ways of insuring this.

First of all, the stalk gripping belts can be made of very resilient material such as soft rubber, foam rubber, a spongy synthetic resin or the like so that the belts will have sufficient resiliency and "give" to grip the stalks both when the stalk gripping belts are near the ground (where the diameter of the stalk is great) and also when the belts are near the top of the stalk (where the diameter is much smaller). In other words, the resiliency or "give" of the belts compensates for the changing diameters of stalks that must be gripped.

Figure 12:
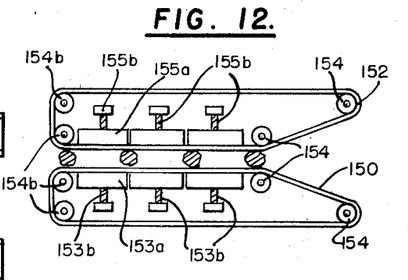
FIGURE 12 is a diagrammatic view representing an embodiment similar to that shown in FIGURE 8.

Alternatively, if it is desired to make the belts of relatively hard and not very resilient rubber, the belts can still be made to accommodate varying stalk diameters by mounting the belts immediately below the defoliators in such a way that the mounting itself is resilient. In other words, referring now to FIGURE 12, the stalk gripping belts 150 and 152 are seen to be mounted so as to move over a plurality of pulleys 154, 154b and 154b in much the same fashion as has been described previously with respect to FIGURE 8. However, in FIGURE 12 the segmented back up means 153a for belt 150 and the segmented back up means 155a for belt 152 are "spring loaded" or "spring tensioned" (e.g. by means of springs 153b and 155b) so that the belts will press toward each other with desired degree of force—and more specifically with enough force so that the belts 152 and 154 will firmly grip the tobacco stalk regardless of size and regardless of whether the belts are near the lower part of the stalk or near the upper part of the stalk. (A number of mechanical arrangements which are equivalent to that shown in FIGURE 8 will readily occur to those skilled in the art.)

Now, if one desired to neither make the belts of resilient material nor to provide a resilient back-up for the belts, there is still another way in which the stalk gripping belts can be made to accommodate the varying diameter stalks that will be encountered on successive runs through a tobacco field. In particular, "floating" or "swinging" frameworks for supporting the belting can be employed and in such an event the frameworks will preferably be hung or suspended so that the distance between the two belts will correspond to the smallest diameter stalks that may be encountered (and some may prefer to leave no distance at all between the belts, with the result that they will be touching). In such a case, the tobacco stalks themselves are tough enough and sturdy enough to force the belts apart and this of course results in a forced gripping of the stalks by the belts. The drawings show one such "floating" supporting frame for the belts.

No invention would be involved in using means which would be equivalent to belts 150 and 152. Specifically, no invention would be involved in using an array or series of small rollers or discs in place of belts 150 and 152. Such rollers or discs could be driven in any suitable manner so that they would operate in almost exactly the same way as driven belts.

FLOATING SUPPORTING FRAME

Referring to FIGURES 1 and 2 it will be seen that the side members 144 and 145 are more or less suspended from the upper main frame of the harvester by means of cables 170, 171, 176 and 169 by suitable anchor points located adjacent the lower ends of said cables. The upper ends of said cables pass over a suitable arrangement of pulleys and/or reels. For instance, cable 170 winds around reel 173; cable 171 winds around reel 172; cable 176 passes over pulley 175 and then around reel 172a; and cable 169 passes upwardly over a pulley 169a to a reel 173a. Reels 172, 172a, 173 and 173a are mounted on a common shaft 174 and this shaft also carries a drive reel 174a. Drive reel 174a is connected to a motor or hydraulic piston means that can be actuated by the driver of the harvester so that when the drive reel 174a (and thereby shaft 174) is rotated by virtue of the motor or power source, all of the other reels (173, 173a, 172a, 172) will also rotate and in doing so either raise or lower the entire tobacco leaf stripping assembly.

Figure 9:
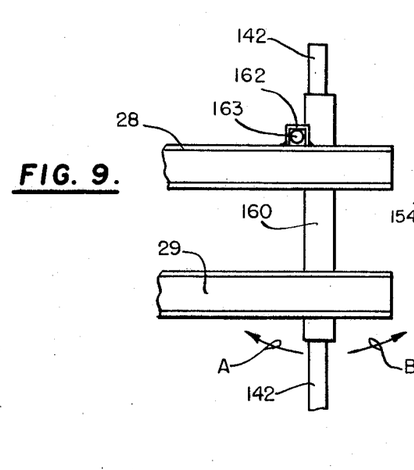
FIGURE 9 is an enlarged fragmentary view illustrating the means for pivotally supporting the posts that are connected to the "floating carriage"

In this regard it will be further noted that the sides 144 and 145 are provided on their forward ends and with upwardly extending posts 142 and 140. While the lower portions of posts 140 and 142 are attached to the sides 145 and 144 the upper ends of these posts are mounted in the manner which is indicated in greater detail in FIGURE 9. Referring now to FIGURE 9 it will be seen that the post 142 is mounted so as to be freely slidable within an annular guide tube 160 so that post 142 can move up and down in response to a corresponding upward movement of the aforesaid cables or a downward movement due to the weight of the suspended leaf stripping assembly. To the outside of annular tube member 160 is welded a pin 163 that is disposed at approximately right angles to the axis of member 160 and pin 163 is long enough so that it extends within a U-shaped inverted bracket 162 welded onto a portion of main frame member 28. With this arrangement both the annular guide tube 160 and the post 142 are free to swing or pivot in the directions indicated by arrows A and B. It will be seen therefore that the harvester is in effect provided with a "floating carriage" for the leaf stripping assembly. This "free swinging" or "floating" arrangement for the leaf stripping assembly is quite valuable because its permits said assembly to maintain a substantially vertical attitude at all times regardless of the contour of the ground or the attitude of the remaining parts of a harvester. Thus, even if the harvester is travelling over sloping ground, the leaf stripping assembly will maintain a perfectly vertical attitude so that it can most easily and efficiently work on the tobacco stalks (which are perfectly vertical regardless of the specific contour of the earth at any given point).

The full advantage of a "free swinging" or "floating" leaf stripping assembly is achieved when it is utilized in conjunction with the pair of stalk gripping belts 150 and 152 which grip those portions of the tobacco stalks that are immediately below the defoliating members 42 and 44 and preferably the belts and their back up means are used together. More particularly, the "free swinging" or "floating" supporting frame cause the belts 150 and 152 (and their back up means) to be always in effect pressed toward each other, which means that the belts will press against and firmly grip the tobacco stalks regardless of size and regardless of whether the belts are gripping a lower part of the stalk or an upper part of the stalk.

A spring arrangement (such as shown at 141 in FIGURE 2) may interconnect posts 140 and 142 so that these posts will be urged toward each other to the desired degree. The tension of the spring may be made adjustable so that the extent to which the belts 150 and 152 press toward one another can be varied to meet different conditions encountered in the field. (A number of equivalent arrangements will occur to those skilled in this art.)

SUPPORT FOR CONVEYOR

Figure 10:
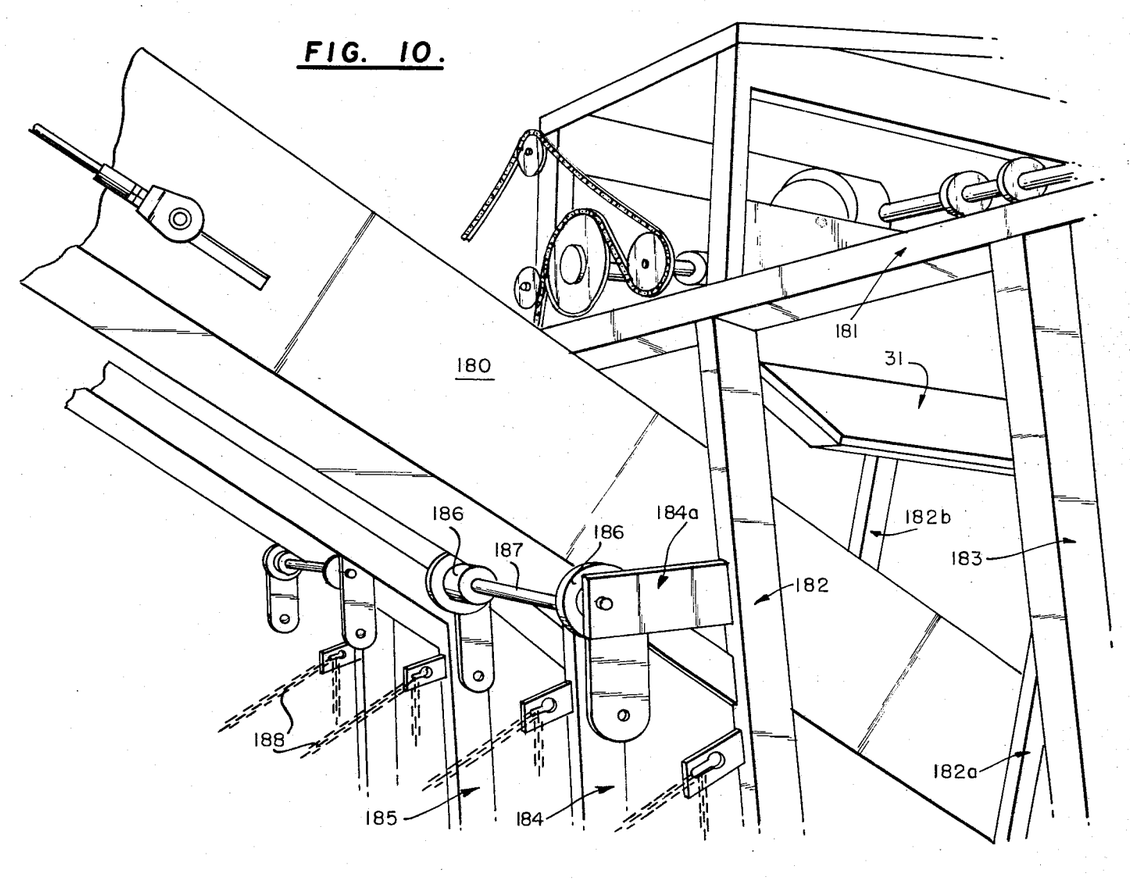
FIGURE 10 is an enlarged fragmentary view illustrating some features on the back side of the harvester.

FIGURE 10 illustrates how the conveyor 104 is contained within housing 180 that projects upwardly and backwardly and also how this housing 180 is supported so that it is free to move so as to accommodate itself to the rise and fall of the "floating" leaf stripping assembly described previously. More particularly, it will be seen that housing 180 is in the form of an elongated or trough box and intermediate its ends, it is supported upon two roller bearings 186 that are joined together by a shaft 187. Posts 184 and 185 in conjunction with bracket 184a and main frame members 182, 182a, 182b, 183, and 181 serve to support the roller bearings.

The lower portion of housing 180 is pivotally attached by any suitable type of hinge connection (not shown) to the side member 144. The combination of the pivotal attachment and the roller bearings 186 permit the housing 180 to move from a steeply inclined position to only a slightly inclined position without any adjustment being necessary by the operator of the harvestor other than the raising or lowering of the "floating" carriage for the leaf stripping assembly. In FIGURE 10, chains 188 are shown which are adapted to support a basket or other suitable receiving means below the discharge end of the inclined conveyors.

Figure 11:
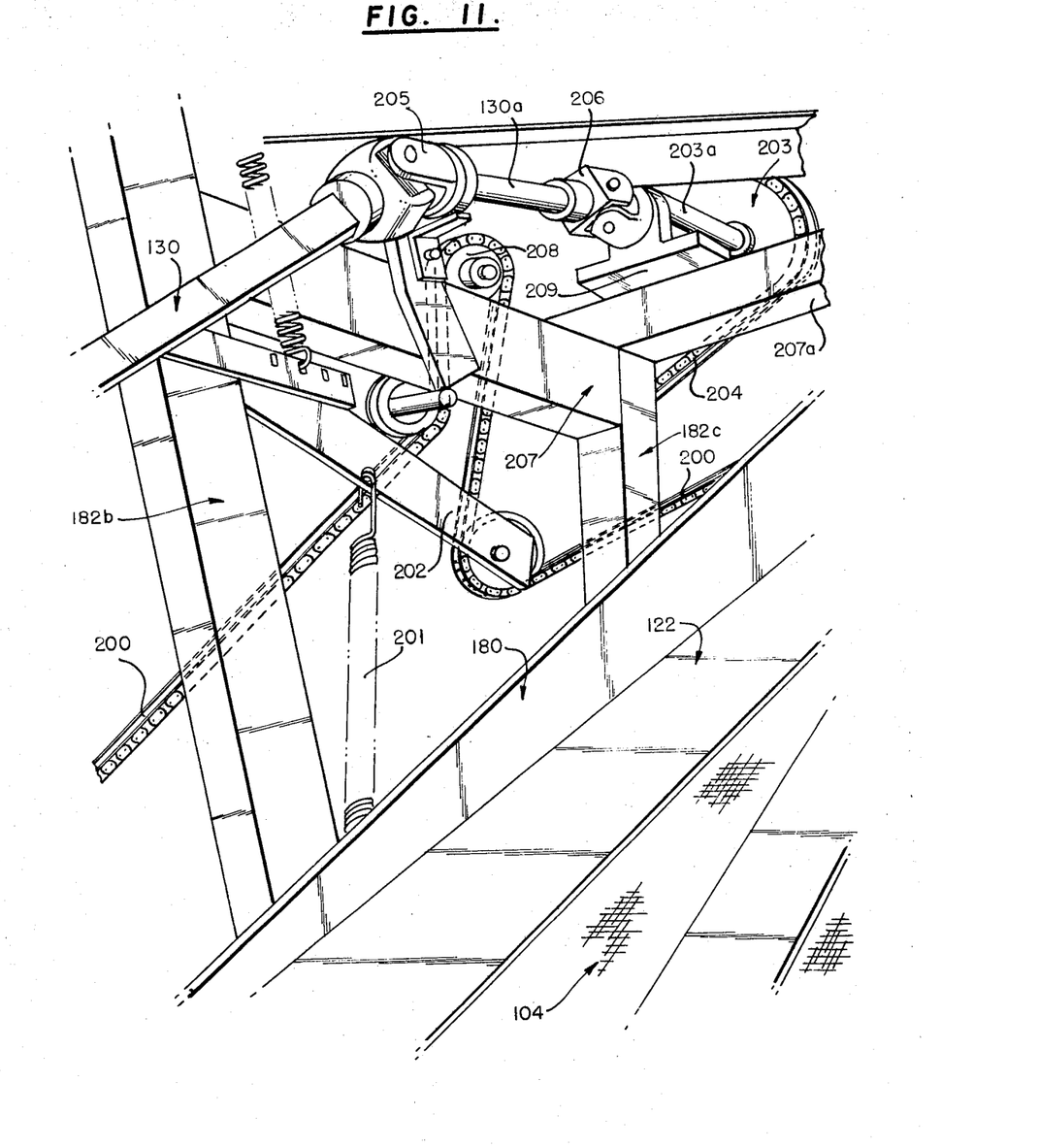
FIGURE 11 is an enlarged fragmentary view showing some of the features of a portion of the drive assembly for the harvester.

FIGURE 11 illustrates a portion of the driver chain. Main frame members 182b, 207, 182c and 207a cooperate to support a mounting bracket 208 that supports a shaft 203a. Shaft 203a is driven by sprocket 203 and chain 204 from the prime power source. Shaft 203a in turn drives shaft 130a through universal 206 and shaft 130a in turn drives shaft 130 through universal 205. The main drive shaft 130 is of the telescoping type so that as the "floating carriage" containing the leaf stripping assembly is raised and lowered the drive shaft 130 will automatically become longer or shorter, as needed. The universal 132 (see FIGURE 6) also facilitates this continuous transmission of power regardless of the raising or lowering of the "floating carriage."

FIGURE 11 also shows part of the chain 200 that is used to take power from the wheels of the harvester and deliver it to one of the pulleys (e.g. 154, 154a or 154b in FIGURE 8 or 154 and 154b in FIGURE 12) so that the pulleys 150 and 152 will move backwardly at exactly the same speed that the harvester is moving forward. (Spring and lever arrangement 201 and 202 serve to maintain tension on the chain 200.)

FIGURE 11 also shows the belt 122 which assists the movement of the leaves upwardly on inclined conveyor belt 104. As is shown in FIGURES 1–3, 6 and 7, belt 122 may be driven by either rollers 120 or 130.

SALVAGE ROLLERS

Although the defoliating members 42 and 44 are very effective in removing most of the leaves from a certain increment of the tobacco stalk, it does sometimes happen that a leaf will remain attached to the stalk by only a thread. When this occurs the sets of lateral conveying rollers 94 and 96 are unable to laterally move the tobacco leaf. If nothing further is done, the leaf will pass out the back of the harvester and be left dangling on the tobacco stalk after the harvester has passed. Since such leaves that remain with the stalk represent a loss, we have provided the means on our harvester to remove them. This means consists of at least one set of "salvage rollers" illustrated as 108 and 110 in FIGURES 3 and 4. These salvage rollers are mounted for rotary movement on the ends of members 105 and 106 and are driven by a chain and sprocket arrangement that derives power from the previously described power shaft 93 and 133. Salvage rollers 108 and 110 are driven at a speed such that there is no relative movement at the point where their peripheral surface contacts the surfaces of rollers 94 and 96, upon which they rest. The leading edge of these salvage rollers are preferably beveled so that when a tobacco leaf that is attached to the stalk by only a thread does move rearwardly it will easily come under the bevelled edge of these salvage rolls and thereafter be readily pulled away from the stalk by virtue of the clamping action which the leaves undergo as they move between either salvage roller 108 and the set of conveying rollers 94 or between the salvage roller 110 and the set of conveying rollers 96.

Figure 6:
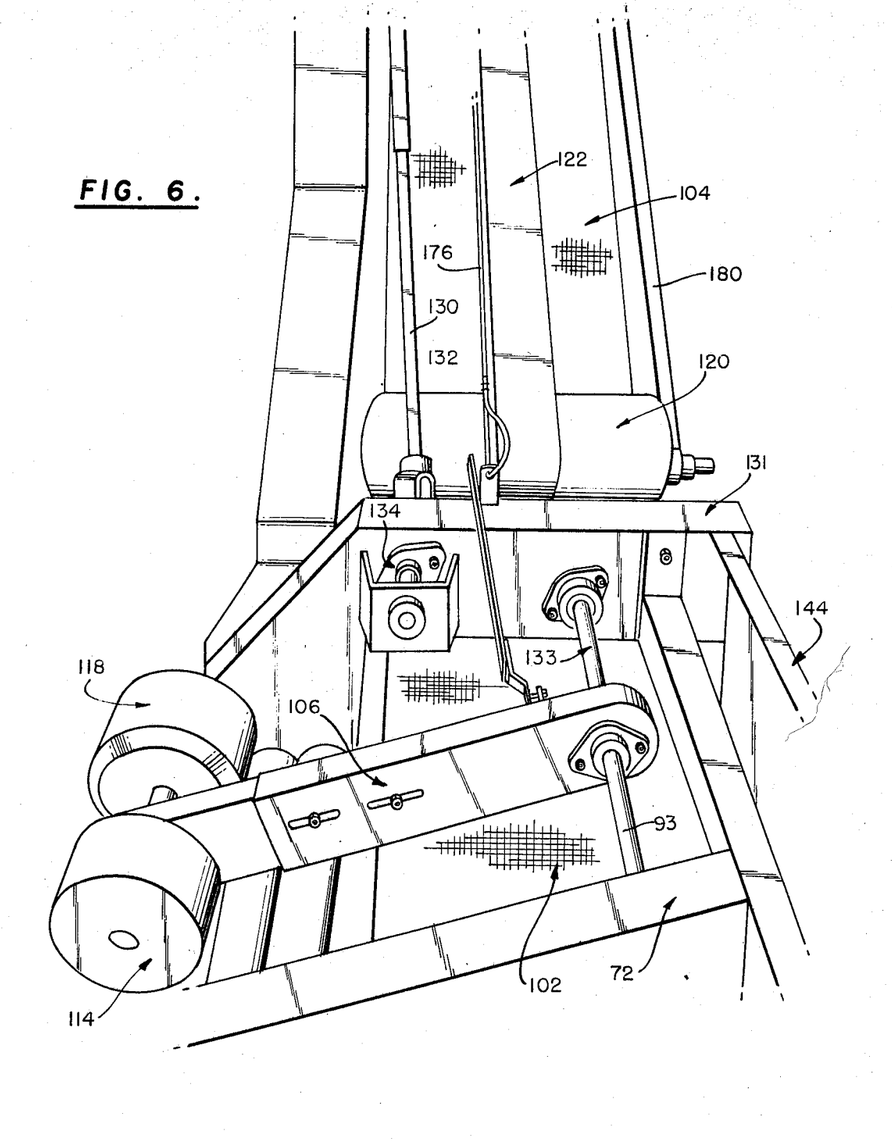
FIGURE 6 is an enlarged fragmentary view showing details of the conveying means.
Figure 7:
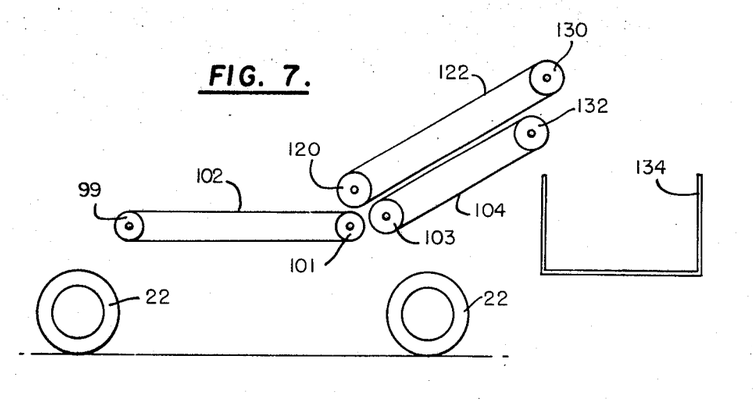
FIGURE 7 is a diagrammatic type drawing illustrating the general positional relationship of some of the conveying and receiving features of the harvester.

As illustrated in FIGURES 5 and 6 there can be two sets of salvage rollers if desired, salvage rollers 114 and 118 being driven by a sprocket and chain arrangement housed within 106 and salvage rollers 112 and 116 being driven by sprocket and chain arrangement housed within 105. In FIGURE 5 it will be noted that both sets of salvage rollers have their leading edges bevelled so as to facilitate an initial entry and clamping of the tobacco leaves.

In conclusion, while the foregoing specification and drawing describe the construction, operation and use of one preferred embodiment of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the appended claims.

What is claimed is:

1. A tobacco harvester for stripping tobacco leaves from the stalks of rows of tobacco plants standing in a field comprising:
    (a) a mobile frame adapted to travel along a row,
    (b) defoliator means carried by said frame for stripping leaves from the tobacco stalks as said frame moves along a row.
    (c) guide means associated with said frame for guiding successive tobacco stalks into said defoliator means,
    (d) conveyor means carried by said frame for receiving and carrying away the loose leaves stripped off by the defoliator means, and
    (e) stalk gripping means located beneath said defoliator means for holding said stalk in an upright position during the interval of time that said defoliator means is stripping leaves therefrom.

2. A harvester according to claim 1 wherein said stalk gripping means comprises two belts that are adapted to grip opposite sides of a tobacco stalk.

3. A harvester according to claim 2 wherein resilient means are provided for resiliently pressing said belts toward each other.

4. A harvester according to claim 3 wherein said resilient means is located immediately behind those portions of the belts at the time they grip opposite sides of a stalk.

5. A harvester according to claim 2 wherein resilient means operatively interconnects the supporting framework for each of said belts.

6. A tobacco harvester according to claim 1 which additionally includes transversely moving conveyors positioned immediately to the sides of said defoliator members in such a position as to initially receive the leaves as they are stripped off and to transport such leaves in a direction generally transverse to the direction of movement of the machine, and a longitudinally moving conveyor positioned laterally outwardly of each transversely moving conveyor onto which the transversely moving conveyor delivers the leaves which it receives, and which is adapted to move the leaves to a receiving area.

7. A tobacco harvester according to claim 1 wherein the defoliator means, the guide means, and the stalk gripping means have at least their front ends suspended from an upper portion of said mobile frame so that at least the front portions of said defoliator means, guide means, and stalk gripping means will have a considerable degree of freedom to swing laterally thru a pendulum-like arc with respect to the longitudinal axis of said harvester.

8. A machine for stripping tobacco leaves off the stalks of rows of tobacco plants standing in a field comprising:
- (a) a mobile frame adapted to travel along a row of tobacco plants,
- (b) defoliator means carried by said frame for stripping leaves from the tobacco stalks as said frame moves along a row,
- (c) guide means associated with said frame for guiding successive tobacco stalks between said defoliator members,
- (d) conveyor means carried by said frame for receiving and carrying away the loose leaves thus stripped off by the defoliator means,
- (e) said defoliator means and guide means having at least their front ends suspended from an upper portion of said mobile frame so that at least the front portions of said defoliator means and guide means will have a considerable degree of freedom to swing laterally with respect to the longitudinal axis of said machine.

9. A harvester according to claim 1 which includes salvage roller means located rearwardly of said defoliator means.

10. A harvester according to claim 9 wherein said salvage rollers are powered.

11. A harvester according to claim 8 which includes salvage roller means located rearwardly of said defoliator means.

12. A harvester according to claim 11 wherein said salvage rollers are powered.

References Cited
UNITED STATES PATENTS

| | | | |
|---|---|---|---|
| 1,769,104 | 7/1930 | Benjamin | 56—33 |
| 2,816,411 | 12/1957 | Wilson | 56—27.5 |
| 2,834,173 | 5/1958 | Wilson | 56—27.5 |
| 2,876,610 | 3/1959 | West et al. | 56—27.5 |
| 3,083,517 | 4/1963 | Wilson | 56—27.5 |
| 3,093,949 | 6/1963 | Splinter | 56—27.5 |
| 3,417,556 | 12/1968 | Jones et al. | 56—27.5 |

RUSSELL R. KINSEY, Primary Examiner